RESILIENT SEAT CUP WITH FINS

Filed Sept. 13, 1966

INVENTOR.
JOHN A. CHERNAK
BY
Gray, Sharpe & Mulholland
ATTORNEYS

INVENTOR.
JOHN A. CHERNAK

BY Fay, Sharpe & Mulholland
ATTORNEYS

United States Patent Office 3,426,798

Patented Feb. 11, 1969

1

3,426,798

RESILIENT SEAT CUP WITH FINS

John A. Chernak, Lyndhurst, Ohio, assignor to Tomlinson Industries, Inc., Cleveland, Ohio, a corporation of Ohio Filed Sept. 13, 1966, Ser. No. 579,140

U.S. Cl. 137—625.33 6 Claims

Int. Cl. B67d *3/00;* F16k *1/06, 1/12*

ABSTRACT OF THE DISCLOSURE

Disclosed is a faucet for use in the dispensing of beer or other carbonated beverages. The faucet is defined by a faucet body having inlet and outlet ports. A fluid passageway in the faucet body interconnects the ports and a seal chamber is defined intermediate the ends of the passageway. A sealing seat is defined in the seal chamber. A resilient seat cup is disposed in the seal chamber having one end thereof fixed with respect to the faucet body. A stem protrudes from the seat cup and in cooperation with a faucet handle provides actuating means for moving the end of the seat cup into and out of engagement with the sealing seat. A plurality of angularly spaced depending fins radiate from the longitudinal axis of the seat cup at the sealing end thereof. The fins extend into the outlet port and cooperate with the walls of the port to divide the port into a plurality of flow paths to thus reduce the tendency of the liquid to spin or turn as it passes from the faucet. A cylindrical tip depends from the seat cup and extends below the fins in order to break the surface tension of any liquid which may be retained in the faucet to thus eliminate afterdrip.

This invention relates to a faucet construction and more specifically to a seat cup design for use in a faucet for dispensing beer or other beverages which are highly carbonated.

There are at least two desirable objectives in faucets used for the dispensing of beer or other carbonated beverages which the prior art has failed to achieve economically. First, the faucet must be so designed as to prevent an undue amount of foaming when the liquid is dispensed and, second, the faucet must be constructed such that the spout will clear immediately when flow is terminated. Immediate clearing eliminates annoying afterdrip, and also prevents accumulation in the faucet of droplets which would otherwise tend to promote bacteria growth and thus produce an unsanitary condition.

It is a primary object of this invention to devise a faucet and seat cup construction which achieves these two objectives.

More specifically, the present invention contemplates a construction which employs a faucet body having inlet and outlet ports with a fluid pasageway in the body interconnecting the ports and a seal chamber intermediate the ends of the passageway. A sealing seat is defined by the seal chamber transverse the axis of the passageway. A seat cup is disposed in the seal chamber with one end of a stem being received in the seat cup and the other end of the stem projecting externally of the valve body. An operating handle is connected to the protruding end of the stem. The novel seat cup comprises a thin wall tubular nipple portion joined at one end to a cylindrical base whose inside diameter is larger than the outside diameter of the tubular nipple portion. The lower end of the nipple includes a reduced diameter portion of frusto-concical shape which is designed to engage a frusto-conical portion of the valve seat. A second frusto-conical surface coaxial

2 and adjacent to the first frusto-conical portion joins the nipple to a downwardly projecting, reduced diameter cylindrical tip section. The cylindrical tip terminates in a frusto-conical point. Downwardly extending fins radiate from the cylindrical tip section and are joined at their upper ends to the second frusto-conical portion, with the radial extent of the fins being such that the fins are receivable in the outlet port.

Referring to the drawings wherein like reference numerals indicate like parts in the various views.

Figure 3:
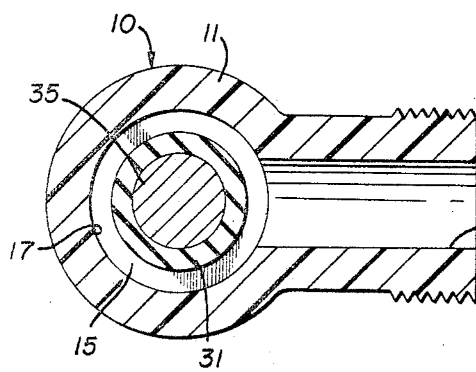
FIG. 3 is a view taken along line 3—3 of FIG. 2.
Figure 1:
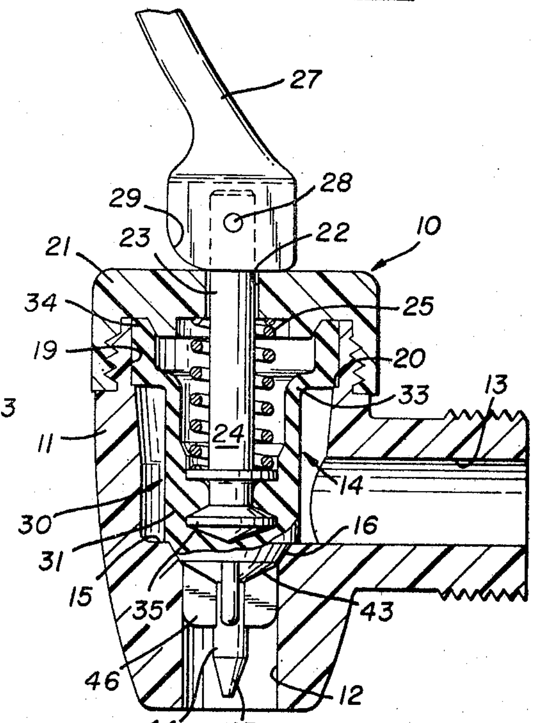
FIG. 1 is an elevational sectional view of a faucet embodying the principles of the instant invention.
Figure 2:
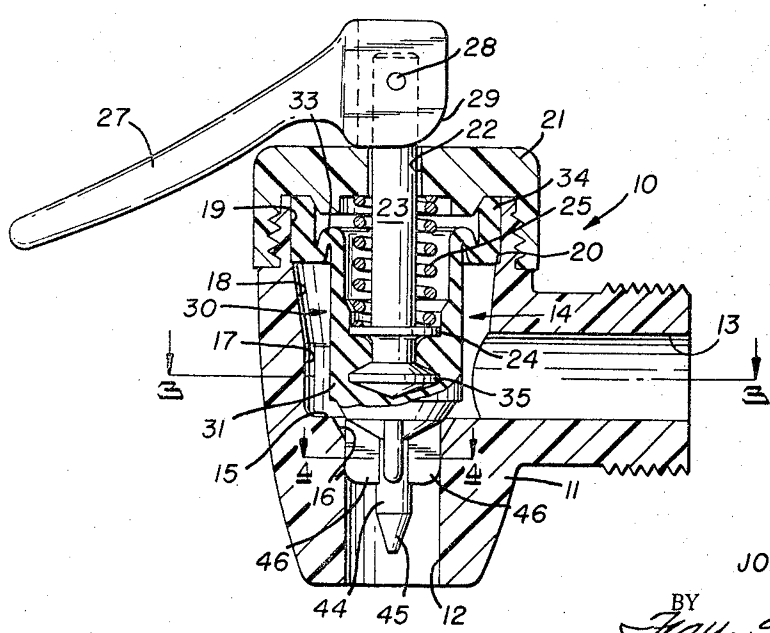
FIG. 2 is a view similar to FIG. 1 showing the valve in open position.
Figure 4:
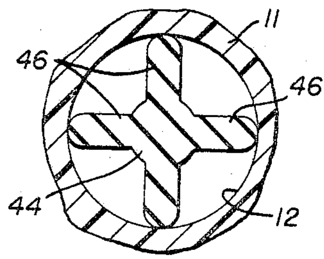
FIG. 4 is a sectional view, in enlarged scale, taken along line 4—4 of FIG. 2.

Referring now to FIG. 1, a faucet assembly constructed in accordance with the principles of the invention is shown generally at 10. The assembly 10 comprises a body 11 having an outlet port 12 and an inlet port 13. A fluid passageway 14 is provided in the valve body with the passageway being in fluid conducting communication with the outlet and inlet ports. The passageway 14 comprises a sealing seat 15 which is oriented transversely of the longitudinal axis of the outlet 12. The sealing seat includes a frusto-conical lip portion 16. The passageway 14 comprises a cylindrical portion 17 joining the transverse seat 15 and which merges into a fusto-conical portion 18 and thence into an enlarged cylindrical portion 19. A transverse shoulder 20 is formed at the juncture of the frusto-conical portion 18 and the cylindrical section 19.

The portions 17, 18 and 19 cooperate to form a seal receiving chamber, with the chamber being enclosed at its upper end by a bonnet assembly 21 which is threaded over the exterior of the valve body 11. The bonnet includes a central opening 22 through which is slidably received a stem 23. The stem has a radially extending collar 24 which provides an abutment for one end of a compression spring 25. The other end of the spring 25 is engaged against the bonnet 21 thereby to urge the stem 23 in a direction toward the seat 15. A handle 27 is attached by a pin 28 to the protruding end of the stem, with the handle having an arcuate cam portion 29 which engages against the upper surface of the bonnet 21 to displace the stem 23 in a direction away from the seat 15.

Received in the seal chamber is a resilient sealing member or seat cup, indicated generally by the reference numeral 30. The seat cup 30 comprises a nipple portion 31, a longitudinally extending web portion 32, a transverse arcuate shoulder portion 33 and a cylindrical base portion 34. This broad construction of the seat cup is illustrated as prior art in U.S. Patent No. 3,207,472. Similar to the construction shown in that patent, the end of the stem 23 includes a knob 35 which is snap-fitted into a recess 36 formed in the nipple portion 31 of the seat cup.

Figure 5:
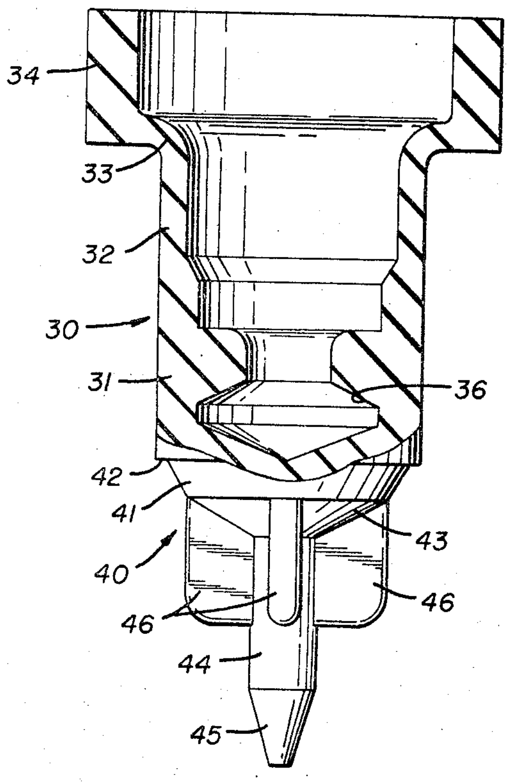
FIG. 5 is an elevational view, in enlarged scale and partly in section, of the seat cup employed in the instant invention.

The seat cup 30 further includes novel flow control means, indicated generally by the reference numeral 40, which depends from the lower end of the nipple portion 31. This flow control means comprises a first frusto-conical surface 41 with a transverse shoulder 42 at the juncture of the nipple 31 and the surface 41. A second frusto-conical surface 43, having an angle measured from the longitudinal axis of the seat cup which is greater than the angle of the first frusto-conical portion 41, is immediately adjacent the first frusto-conical portion and merges into a cylindrical tip 44 which is coaxial with the longitudinal axis of the cup 30. The tip 44 terminates in a frusto-conical portion 45 at its lower end. The frusto-conical portion 43 has depending therefrom a plurality of equally spaced fins 46 which extend radially from the cylindrical tip 44. As shown in FIG. 5, the fins 46 extend only a portion of the way down the length of the tip 44, with the radial dimension of the fins 46 being substantially equal to the base dimension of the frusto-conical portion 43.

The seat cup 30 is received in the seal chamber, with the frusto-conical portion 43, the fins 46 and the cylindrical tip 44 being received in the outlet port when the valve is in the closed position. The frusto-conical portion 41 engages the frusto-conical lip 16 with the transverse shoulder 42 resting on the transverse seat 15. The length of fins 46 is such that the fins are below the plane of seat 15 when the valve is open thus assuring immersion of the fins in the flow stream as the liquid is dispensed. Moreover, the fins have a radial extent closely approximating the radial dimension of the outlet port 12 thereby dividing the port into four separate flow paths. The relatively close fit betwen the fins and the outlet port also provides lateral support for the stem, thus tending to prevent the stem from canting or pivoting about the bonnet as a fulcrum when the faucet is opened.

Figure 7:
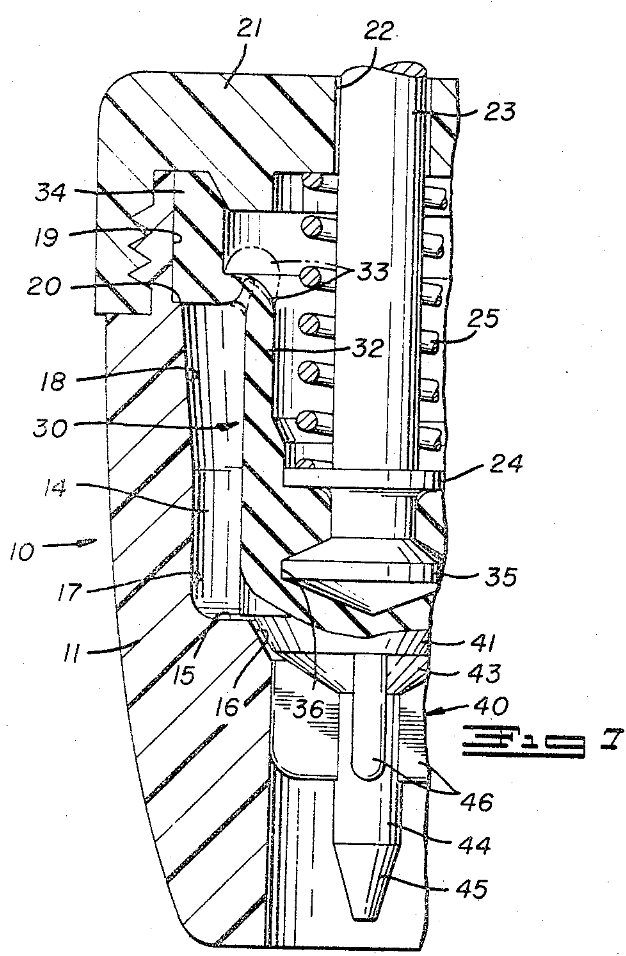
FIG. 7 is a partial elevation view, in enlarged scale and partly in section, showing the valve in partly closed position.
Figure 6:
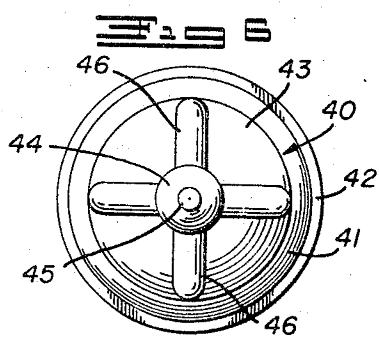
FIG. 6 is a bottom plan view of the seat cup of FIG. 5.

It is a well-known phenomenon that a cylinder of liquid passing from an orifice has a certain amount of instability and tends to twist or spin as the liquid emerges. It has been found with the seat cup of the instant design that the provision of the four equally-spaced fins 46 gives desirable control over the stream of liquid and the tendency of the liquid to spin or turn as it passes from the spout is eliminated. The result is that the foaming which ordinarily occurs with dispensing liquids such as beer is significantly reduced. Moreover, the tip 44 further controls the downward flow of liquid and also tends to break the surface tension of any liquid which may be retained in the spout and thus eliminate afterdrip. To reduce further the possibility of liquid being retained in the outlet port, the frusto-conical seat 16 with the frusto-conical portion 41 provides a large area of restriction for the liquid immediately prior to the closing of the valve. This condition is illustrated in FIG. 7 wherein the valve is in the partially closed position. Because of the restriction of the flow path of the liquid, which is ordinarily under pressure, a high velocity stream of liquid is created just prior to the closing of the faucet. This high velocity stream produces a "flushing" action which prevents accumulation of liquid in the faucet outlet after closing and thereby contributes to the elimination of afterdrip. Also, of course, by preventing such accumulations within the faucet, bacteria growth is inhibited, permitting the faucet to meet the sanitary standards which prevail in the liquid food dispensing industry.

I claim:

1. A faucet construction comprising:
a faucet body having non-aligned inlet and outlet ports;
a fluid passageway in the faucet body interconnecting said ports;
a seal chamber intermediate the ends of the passageway;
a sealing seat defined by the seal chamber;
resilient sealing means disposed in the seal chamber, said sealing means including a generally cylindrical nipple portion about which fluid is adapted to pass;
one end of said sealing means being fixed with respect to said body;
actuating means connected to said sealing means for moving the other end of said sealing means into out of engagement with said sealing seat;
said other end of said sealing means including a plurality of angularly spaced depending fins radiating from the longitudinal axis of said sealing means and extending into said outlet port in cooperation with the walls of said port to divide said outlet port into a plurality of flow paths.

2. The combination of claim 1 wherein said sealing seat includes a frusto-conical lip portion;
said other end of said sealing means including a frusto-conical portion separate from said fins and adapted to engage said lip portion in the closed position of said valve.

3. The construction of claim 1 and further including:
a cylindrical tip depending from said other end of said sealing means and extending below said fins.

4. A faucet contruction comprising:
a faucet body having inlet and outlet ports;
a fluid passageway in the faucet body interconnecting said ports;
a seal chamber intermediate the ends of the passageway;
a sealing seat defined by the seal chamber;
said sealing seat including a frusto-conical lip portion;
resilient sealing means disposed in the seal chamber;
one end of said sealing means being fixed with respect to said body;
actuating means connected to said sealing means for moving the other end of said sealing means into and out of engagement with said sealing seat;
said other end of said sealing means including means extending into said outlet port and cooperating with the walls of said port to divide said output port into a plurality of flow paths;
said other end of said sealing means further including a frusto-conical portion separate from said dividing means adapted to engage said lip portion;
said dividing means comprising a plurality of angularly spaced depending fins radiating from the longitudinal axis of said sealing means;
said dividing means further including a second frusto-conical surface adjacent said first frusto-conical surface on said sealing means, with said fins depending from said second frusto-conical surface; and
a cylindrical tip coaxial with the longitudinal axis of said sealing means and depending from said second frusto-conical surface;
said fins being angularly spaced about the periphery of said cylindrical tip.

5. A resilient seal adapted for controlling the flow of fluid through a faucet comprising:
an elongated tubular base portion having a free end;
an elongated tubular nipple portion concentric with the base portion;
a transversely extending shoulder portion joining the base portion to the nipple portion;
a plurality of angularly spaced depending fins secured to the bottom of said nipple portion and radiating from the longitudinal axis of the sealing means;
said bottom of said nipple portion comprising frusto-conical surface means with said fins depending from said surface means;
a cylindrical tip coaxial with the longitudinal axis of said sealing means depending from said frusto-conical surface means, with said fins angularly spaced about the periphery of said cylinder tip.

6. The combination of claim 5 wherein said frusto-conical surface means comprises:
a first frusto-conical surface spaced longitudinally from said fins;
a second frusto-conical surface adjacent said first frusto-conical surface, with said fins depending from said second frusto-conical surface;

the radial extent of said fins being substantally equal to the base dimension of said second frusto-conical surface.

References Cited

UNITED STATES PATENTS

| | | | |
|---|---|---|---|
| 586,996 | 7/1897 | Glauber | 251—120 |
| 2,888,238 | 5/1959 | Leathers et al. | 251—358 |
| 3,104,089 | 9/1963 | Seltsam | 251—331 X |
| 3,282,296 | 11/1966 | Glasgow | 251—358 X |
| 3,348,742 | 10/1967 | Assalit | 251—331 X |

ARNOLD ROSENTHAL, *Primary Examiner.*

U.S. Cl. X.R.

251—331, 120